(12) United States Patent
Schoor et al.

(10) Patent No.: US 6,827,399 B2
(45) Date of Patent: Dec. 7, 2004

(54) CHILD SAFETY SEAT

(75) Inventors: Ellen Schoor, Gerstetten (DE); Erik Emmert, Ulm (DE); Martin Haas, Ulm (DE)

(73) Assignee: Britax Romer Kindersicherheit GmbH, Ulm (DE)

( * ) Notice: Subject to any disclaimer, the term of this patent is extended or adjusted under 35 U.S.C. 154(b) by 0 days.

(21) Appl. No.: 10/410,698

(22) Filed: Apr. 9, 2003

(65) Prior Publication Data

US 2003/0193224 A1 Oct. 16, 2003

(30) Foreign Application Priority Data

Apr. 16, 2002 (GB) .............................................. 0208678

(51) Int. Cl.[7] .............................................. B60N 2/26
(52) U.S. Cl. .............................. 297/250.1; 297/256.13
(58) Field of Search ........................ 297/250.1, 256.13, 297/377

(56) References Cited

U.S. PATENT DOCUMENTS

| 3,101,972 | A | * | 8/1963 | Laughlin ..................... 297/377 |
| 3,334,944 | A | * | 8/1967 | Gould et al. ................. 297/377 |
| 3,423,773 | A | * | 1/1969 | Yamate ........................ 5/610 |
| 3,992,056 | A | * | 11/1976 | Koziatek et al. ....... 297/256.13 |
| 4,640,545 | A |   | 2/1987 | von Wimmersperg |
| 4,688,850 | A |   | 8/1987 | Brownlie et al. |
| 5,265,932 | A | * | 11/1993 | Leonard ..................... 297/131 |
| 6,299,249 | B1 | * | 10/2001 | Mori ..................... 297/256.13 |

FOREIGN PATENT DOCUMENTS

| EP | 0 485 121 A1 | 11/1991 | ............ B60N/2/28 |
| EP | 0 554 807 A2 | 8/1993 | ............ B60N/2/00 |
| EP | 0 949 113 A2 | 10/1999 | ............ B60N/2/28 |

* cited by examiner

*Primary Examiner*—Peter M. Cuomo
*Assistant Examiner*—Joseph Edell
(74) *Attorney, Agent, or Firm*—Davis & Bujold, P.L.L.C.

(57) ABSTRACT

A child safety seat comprises a seat body having a seat portion (12), a backrest (14) with an outwardly facing rear surface, and a support mechanism comprising an abutment member (24) and a link (32) having one end connected to the abutment member (24) and another end pivotally connected to the outwardly facing rear surface. The abutment member (24) is movable through a predetermined angle of greater than 90° between a stowed position in which the link (32) and the abutment member (24) are parallel to and in close proximity to the outwardly facing rear surface and a deployed position in which at least one edge of the abutment member (24) is held by the link (32) in a position spaced apart from the outwardly facing rear surface. A limit device prevents angular movement of the link (32) beyond the deployed position.

6 Claims, 4 Drawing Sheets

CHILD SAFETY SEAT

FIELD

This invention relates to a child safety seat comprising a seat body having a seat portion, a backrest with an outwardly facing rear surface, and a support mechanism comprising an abutment member and a link having one end connected to the abutment member for relative pivotal movement about a first axis and another end connected to said outwardly facing rear surface for relative pivotal movement about a second pivot axis parallel to the first pivot axis, the abutment member being movable between a stowed position in which the link and the abutment member are parallel to and in close proximity to said outwardly facing rear surface and a deployed position in which at least one edge of the abutment member is held by the link in a position spaced apart from said outwardly facing rear surface.

RELATED ART

A safety seat of this type is disclosed in U.S. Pat. No. 4,688,850.

It is an object of the invention to provide a safety seat having a simple mechanism that can be mounted on a vehicle seat either in an upright or a reclined position.

SUMMARY OF THE INVENTION

According to the invention, in a child safety seat of the type described above, the link is movable from a stowed position in which it is in line with the abutment member, through a predetermined angle of greater than 90° relative to said outwardly facing rear surface, to a deployed position, a limit device being arranged to prevent angular movement of the link beyond said deployed position.

Thus, when the abutment member is in its deployed position, a force thereon tending to urge it towards the backrest tends to urge the link to move through an angle greater than said predetermined angle and is, therefore, resisted by the limit means.

BRIEF DESCRIPTION OF THE DRAWINGS

An embodiment of the invention will now be described with reference to the accompanying drawings, in which.

DETAILED DESCRIPTION OF THE PREFERRED EMBODIMENT

Figure 1:
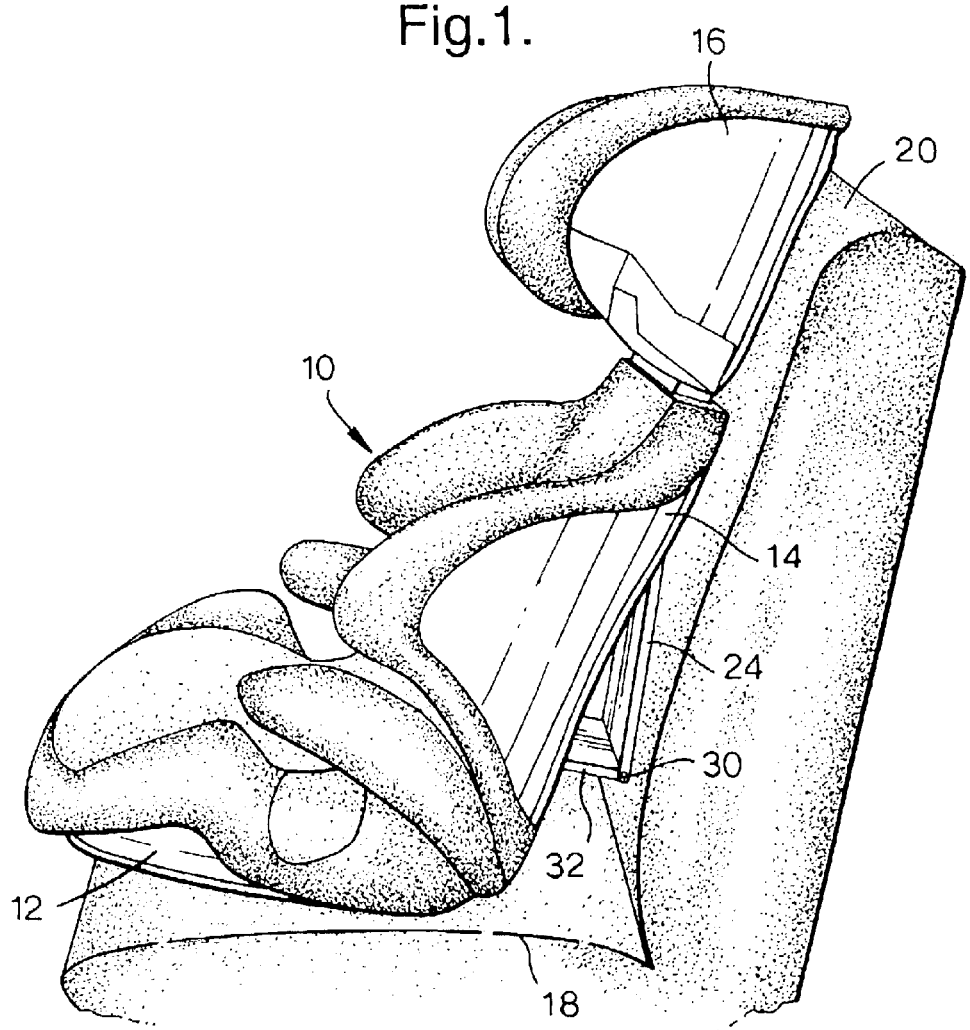
FIG. 1 is a side view of a child safety seat in accordance with a first embodiment of the invention, positioned on a vehicle seat with its support mechanism in a deployed position.

Referring to FIG. 1, a child safety seat 10 has a seat body comprising a seat portion 12, a backrest 14 and a headrest 16. The seat 10 is positioned on the seat cushion 18 of a vehicle seat with the upper part of its backrest 14 abutting against the seat back 20 of the vehicle seat.

Figure 2:
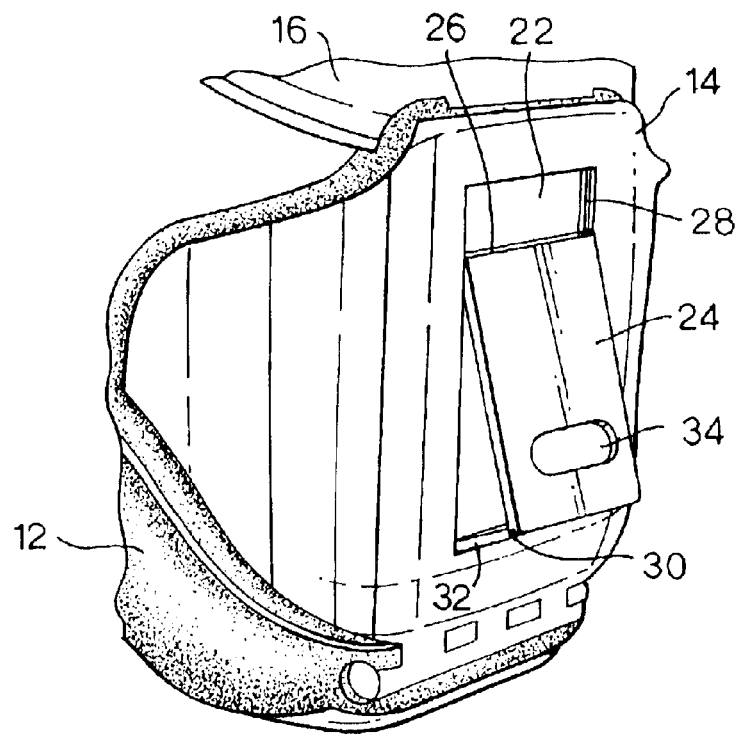
FIG. 2 is perspective view of the rear of the backrest of the seat shown in FIG. 1, with the support mechanism in an intermediate position.

As can most clearly be seen in FIG. 2, the back surface of the backrest 14 contains a rectangular recess 22. An abutment member 24, of thickness slightly less than the depth of the recess 22, has a pivot pin 26 formed integrally with its upper edge. The ends of the pivot pin 26 engage in sliders 27, which are received in respective guide tracks 28 in the vertical side edges of the recess 22. A first pivot axle 30 extends along the bottom edge of the abutment member 24 and pivotally connects it to an adjacent edge of a rectangular link 32. The opposite edge of the link 32 is pivotally connected to a third pivot axle not shown, which extends across the recess 22 in close proximity to the bottom edge thereof.

Figure 3:
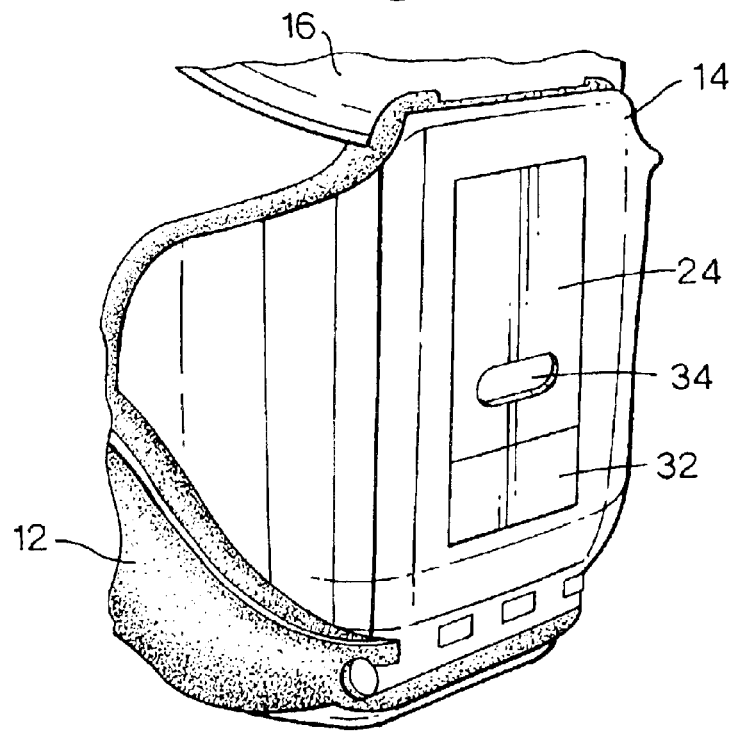
FIG. 3 is a perspective view, similar to FIG. 2, with the support mechanism in a stowed position.
Figure 2A:
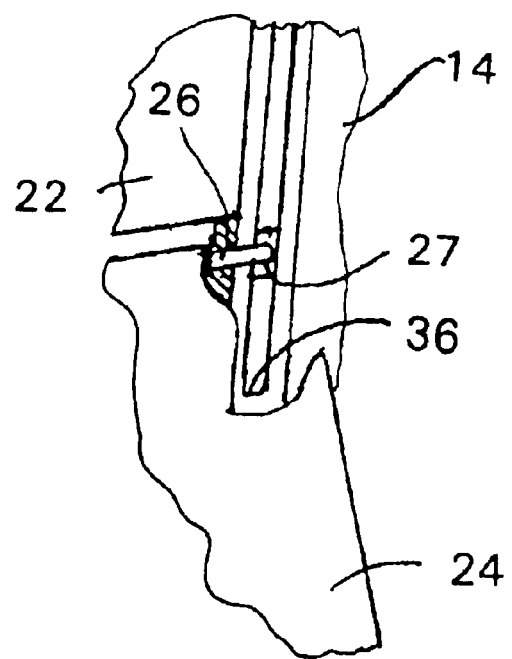
FIG. 2A is a fragmentary view on an enlarged scale of the upper part of the support mechanism in the position shown in FIG. 2.

As shown in FIG. 3, when the pivot pin 26 is positioned at the top of the recess 22, the abutment support member 24 and the link 32 lie flat within the recess 22. The abutment member 24 has an opening 34 to allow such abutment member 24 to be pulled outwardly from this position. When the abutment member 24 is pulled outwardly, the link 32 initially moves to the position shown in FIG. 2, in which it is at an obtuse angle to the abutment member 24. Further outward movement of the abutment member 24 causes the pivot pin 26 to move further down the guide tracks 28 than is shown in FIG. 2.

When the position shown in FIG. 1 is reached, in which the link 32 is at an acute angle to the abutment member 24, the sliders on the pivot pin 26 abut against stops 36 in the guide tracks 28 to prevent further downward movement of the top edge of the abutment member 24. In this fully deployed position, the abutment member 24 abuts against the vehicle seat back 20 as shown in FIG. 1, so as to hold the child seat in a reclined position. Since the abutment member 24 and the link 32 are at an acute angle to one another, they are held in their deployed position, upward movement of the first pivot axle 30 is prevented by their abutment with the vehicle seat back 20 when the child seat 10 is secured in place on the vehicle seat by a vehicle seat belt (not shown).

When the child seat 10 is removed from the vehicle seat, the abutment members 24 and the link 32 can be pushed back to the position in FIG. 3. The child seat 10 can now be secured to the vehicle seat with the lower part of the back of its backrest 14 abutting the vehicle seat back 20. The child seat is now in an upright position.

Figure 4:
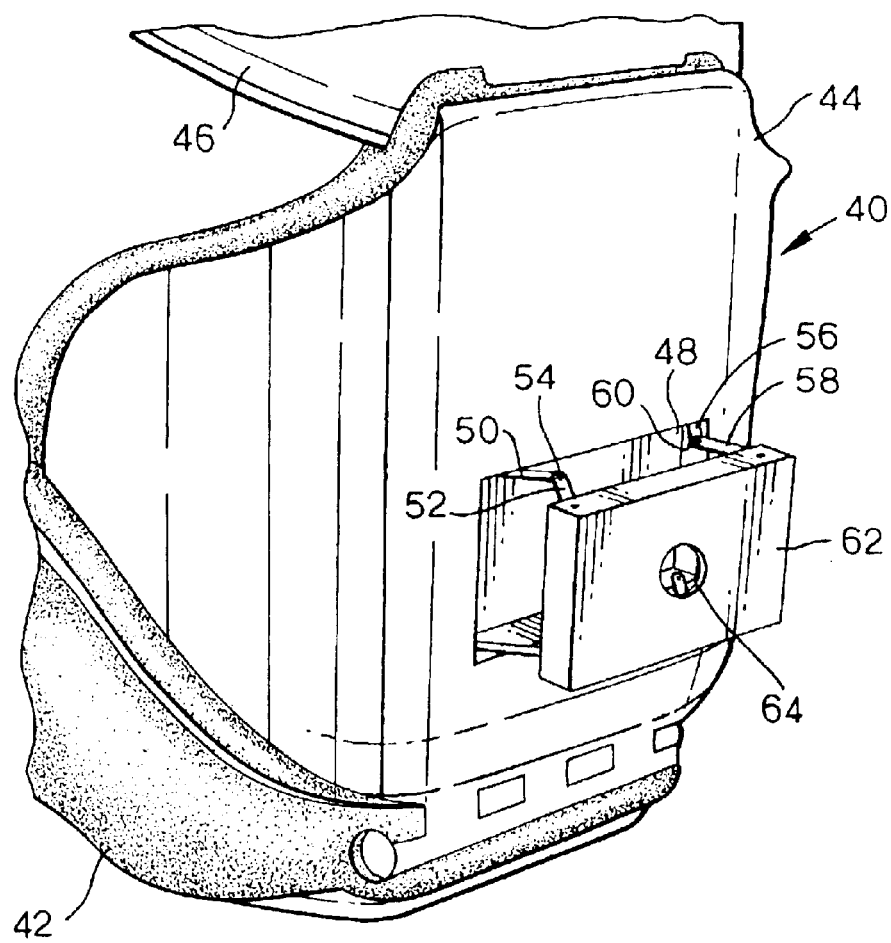
FIG. 4 is a perspective view, similar to FIG. 2, of a second embodiment of the invention, support mechanism in an intermediate position.

FIG. 4 shows a child safety seat 40, which is similar to the seat 10 of FIGS. 1 to 3, in that it has a seat body comprising a seat portion 42, a backrest 44 and a headrest 46. The back surface of the backrest 44 contains a rectangular recess 48.

Figure 5:
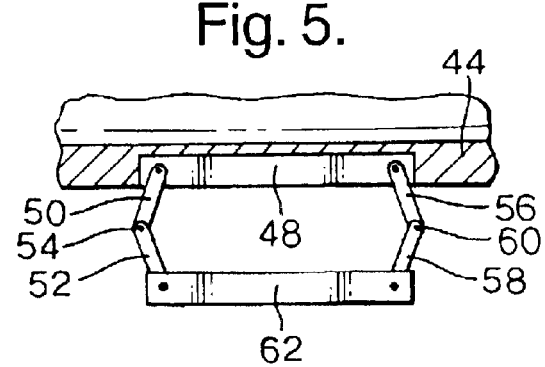
FIG. 5 is a scrap plan view showing the support mechanism of the embodiment shown in FIG. 4 in a deployed position.

A first link member 50 has a first end pivotally mounted within the recess 48 close to the left hand edge thereof, as viewed in FIGS. 4 and 5. A second link member 52 has a first end pivotally attached 54 to a second end of the first link member 50. A third link member 56 has a first end pivotally mounted within the recess 48 close to the right hand edge thereof, as viewed in FIGS. 4 and 5. A fourth link member 58 has a first end pivotally attached by a pivot joint 60 to a second end of the third link member 50. A rectangular abutment member 62 has opposite ends pivotally attached to second ends of the second and fourth link members 52 and 56 respectively. The pivot joints 54 and 60 incorporate stops to prevent them from moving further apart from one another than the position shown in FIG. 5.

When the pivot joints 54 and 60 are displaced towards one another, as shown in FIG. 4, pressure on the abutment member 62 towards the backrest 44 causes the abutment member 62 to move to a stowed position within the recess 48. The seat 40 can now be secured to a vehicle seat with the lower part of the back of its backrest 44 abutting the vehicle seat back. The child seat is now in an upright position.

The abutment member 62 contains a hole 64 that serves as a finger grip, allowing it to be pulled outwardly from its stowed position. When the abutment member 62 is in the position shown in FIG. 5, a force thereon towards the backrest 44 urges the pivot joints 54 and 60 against their stops, preventing further inward movement. In this fully deployed position, the abutment member 62 can abut against the vehicle seat back, so as to hold the child seat in a reclined position.

What is claimed is:

1. A child safety seat comprising a seat body having a seat portion, a backrest with an outwardly facing rear surface, and a support mechanism comprising an abutment member and a link having one end connected to the abutment member for relative pivotal movement about a first pivot axis and another end connected to said outwardly facing rear surface for relative pivotal movement about a second pivot axis parallel to the first pivot axis, the abutment member being movable between a stowed position in which the link and the abutment member are parallel to and in close proximity to said outwardly facing rear surface and a deployed position in which at least one edge of the abutment member is held by the link in a position spaced apart from said outwardly facing rear surface, wherein the link is movable from the stowed position in which the link is in line with the abutment member, such that the link travels through a predetermined angle of greater than 90° relative to said outwardly facing rear surface, to the deployed position, and a limit device being arranged to prevent angular movement of the link beyond said deployed position.

2. A child safety seat according to claim 1, wherein a guide track is mounted on said outwardly facing rear surface so as to extend perpendicular the second pivot axis and the abutment member has a first end connected to the link and a second end pivotally connected to a slider that engages in said guide track.

3. A child safety seat according to claim 2, wherein the limit device comprises a stop adapted to limit movement of the slider along the guide track.

4. A child safety seat according to claim 3, wherein the abutment member is received in a recess in the seat back when in said stowed position.

5. A child safety seat according to claim 2, wherein the abutment member is received in a recess in the seat back when in said stowed position.

6. A child safety seat comprising a seat body having a seat portion, a backrest with an outwardly facing rear surface, and a support mechanism comprising an abutment member and a link having one end connected to the abutment member for relative pivotal movement about a first pivot axis and another end connected to said outwardly facing rear surface for relative pivotal movement about a second pivot axis extending parallel to the first pivot axis, the abutment member being movable between:

a stowed position in which the link and the abutment member lie in a plane and are parallel to and in close proximity to said outwardly facing rear surface; and a deployed position in which at least one edge of the abutment member is held by the link in a position spaced apart from said outwardly facing rear surface;

wherein the link is movable from the stowed position in which the link and the abutment member lie in the same plane, such that the link travels through a predetermined angle of greater than 90° relative to said outwardly facing rear surface, to the deployed position, a limit device prevents angular movement of the link beyond said deployed position; and the abutment member has an opening therein to facilitate movement of the link and the abutment member from the stowed position to the deployed position.

* * * * *